C. L. WAFFLE.
Corn Planter.
No. 29,734.
Patented Aug. 21, 1860.
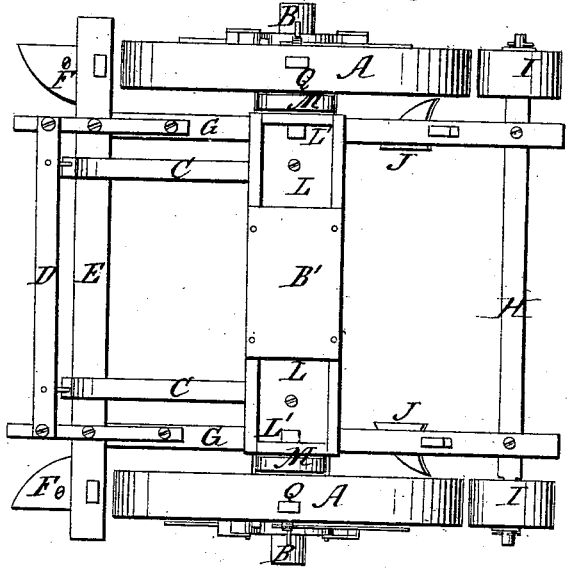
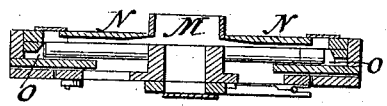
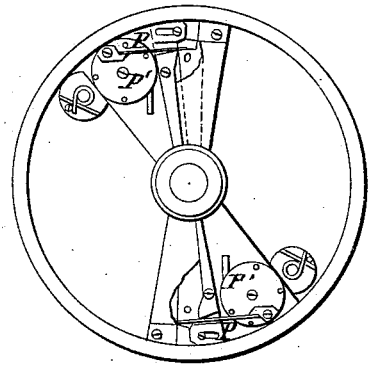
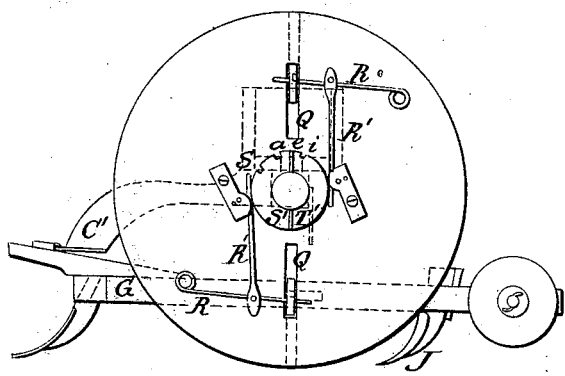
Witnesses —
W. H. H. Carpenter
Horus Gibbs
Inventor
C. L. Waffle

UNITED STATES PATENT OFFICE.

C. L. WAFFLE, OF SHARON, OHIO.

IMPROVEMENT IN CORN-PLANTERS.

Specification forming part of Letters Patent No. 29,734, dated August 21, 1860.

*To all whom it may concern:*

Be it known that I, C. L. WAFFLE, of Sharon, in the county of Medina and State of Ohio, have invented new and useful Improvements in Corn-Planters; and I do hereby declare that the following is a full and complete description of the construction and operation of the same, reference being had to the accompanying drawings, making part of this specification, in which—

Figure I is a top view. Fig. II is a side view. Fig. III is an interior view of one of the wheels, the two being alike; and Fig. IV is a sectional view of one of the wheels.

Like letters refer to like parts.

The two main wheels are seen at A A in Fig. I. These may be made of plank or with a hub, spokes, and fellies, in the manner hereinafter described. The wheels are mounted upon an axle-tree, B, upon which is placed the seed-box B'. From the forward side of the axle-tree extend two arms, C C, which curve downward, as seen at C' in Fig. II. To the forward end of these two arms is hinged the cross-piece D. Below and a little back of this is another cross-piece, (seen at E,) which extends in front of the main wheels. To each end of this and in front of the main wheels are attached the forward shares, F, which plow a light furrow in front of the wheels. Just inside of the wheels and below the axle-tree are two pieces, G G, which are framed into the piece E, and extend backward at right angles a little distance beyond the main wheels. Another cross-piece, H, connects them at the rear end, and upon both ends of this cross-piece is placed the rollers I. Just forward of the rollers I, and upon the inside of the track of the wheels A A, are placed the shares J, which are secured to the pieces G. The corn is dropped through the periphery of the main wheel by means hereinafter to be described, and is covered by the shares J and pressed down by the rollers I, these serving the double purpose of pressing the earth over the corn and preventing the shares J from going too deep.

The seed is placed in the box B', which is attached to the axle-tree. At L there is an opening through which the seed can pass into the sleeve M, and is thence conveyed into the opening N, seen in Fig. IV. From this point it falls into the cavity O, which is an excavation in the wheel or an inclosure between the spokes leading from the sleeve M toward the periphery of the wheel A. At the bottom of this cavity O is a sliding valve, P, which is operated by the wheel P'. This valve P is designed to regulate the quantity of grain that is deposited in each hill. Immediately by the side of the cavity O is a plunger, Q, which is operated by the joint action of the spring R and arm R' and catch S upon the disk S', all of which are seen in Fig. II. The disk S' is secured to the outer end of the axle by the linchpin T. Upon the upper side of this disk are seen three notches, *a e i*. If the linchpin head is placed in the middle one, *e*, the plunger Q will be drawn up by the catch S, which catches into a notch in the arm R' at the moment the plunger stands vertical with the axle, and as soon as the catch slips out of the notch the spring R forces the plunger downward, so that its outer end comes even with the periphery of the wheel A. At the moment the plunger is raised the wheel P' is also turned by the action of the arm R', and the valve P is opened to admit the grains of corn lying upon it into the open space previously occupied by the plunger, which, in its return movement, by the action of the spring R, discharges the grain. If the linchpin-head is placed in the notch *a*, the grain will be discharged forward of the wheel. If it is placed in the notch *i*, it will be discharged behind the track of the wheel, and if in the middle notch, *e*, it will be discharged at that part of the circumference of the wheel that for the moment rests upon the ground. By inserting a small key in front of the catch S the catch is glided over the notch in the arm R' and no seed will be discharged, and by raising the shares and securing them the machine can be transported from place to place.

What I claim as my improvement, and desire to secure by Letters Patent, is—

The disk S, pin T, and notches *a e i*, when these are arranged, substantially as described, in relation to other parts for depositing and covering the grain immediately beneath the periphery of the main wheel, or for scattering the grain forward or behind its track, as specified.

C. L. WAFFLE.

Witnesses:
WM. H. H. CARPENTER,
HORACE GIBBS.